United States Patent Office 2,844,467
Patented July 22, 1958

2,844,467

ADDITION OF UREA ASCORBATE TO BREAD DOUGH AND RESULTING PRODUCT

Simon Lyon Ruskin, New York, N. Y., assignor to Union Carbide Corporation, New York, N. Y., a corporation of New York No Drawing. Application October 4, 1954
Serial No. 460,240

4 Claims. (Cl. 99—90)

The introduction of automatic machinery in breadmaking has emphasized the importance of controlling rapidly the properties of dough such as viscosity, gelatinization of starch granules, dextrinization and consistency.

One object of the present invention is to standardize these factors, which leads to increased softness and keeping quality manifested by better crumb softness and fall in compressibility time.

Another object of my invention is to reduce the fermentation time and to increase the availability of the protein elements of the flour, thus making utilizable a higher gluten content.

At the present time, a major factor in breadmaking has been the uncertainty of the amount and action of the amylases in dough. The action of beta amylase on starch is relatively simple and is characterized by the cleavage of terminal maltose units. The principal function of alpha amylase is to liquefy and dextrinize starch with the end result that the starch becomes susceptible to attack by beta amylase and the formation of dextrines. The combined action of alpha and beta amylase in dough results in a rapid saccharification which provides the fermentable sugar for the yeast. The action on starch is limited since it is mainly injured granules, either damaged by mechanical force during milling process or by gelatinization, which are susceptible to attack by amylases.

It is one object of my invention to produce a controlled gelatinization that is independent of the milling process, thus allowing improvements in milling that are milder mechanically and retain more of the useful elements of the wheat, particularly those of the endosperm which contains the vitamins, minerals and protein.

In normal sound flour, the amount of beta amylase far exceeds that of alpha amylase, but when the wheat is allowed to sprout there is a pronounced production of alpha amylase, whereas the increase in beta amylase is only small. Flours made of sprouted wheat are difficult to bake out properly due to excessive formation of dextrins. Both the dough and the bread crumb tend to be sticky and there may be sagging on the loaf. On the other hand, if a flour has a natural deficiency of alpha amylase, the saccharification is restricted to that caused by the beta amylase and the gas production will tend to stop, or at any rate be insufficient in the final stages. Thus, an adequate level of alpha amylase activity is essential to produce the desired starch degradation and to ensure sufficient gas production. To accomplish this latter aim, various fungal enzymes containing alpha amylase have been tried but these frequently have side reactions such as proteolytic action, they may modify the taste, their action is uncertain and they are expensive. Various means of purification of such enzymes have been employed, but these are costly and not uniform.

I have found that I can accomplish the desired results in breadmaking by chemical rather than enzymatic means, making the starch granule susceptible to beta amylase in a fixed uniform degree independent of the mechanical injury of the starch granule.

One of the common practices employed to secure an increase of alpha amylase is the addition of malt supplements. These frequently lead to excessive dextrinization with undesirable taste effects and loss in viscosity associated with disturbed tackiness impairing the operation of automatic machinery.

It is another object of my invention to diminish the amount of malt supplement needed to control the efficiency of the action of alpha amylase.

To accomplish the purpose of my invention I employ urea ascorbate, calcium urea ascorbate or calcium ascorbate depending on the objective to be obtained.

While ascorbic acid has in the past been added to flour as a so-called conditioner, it has many serious disadvantages. The pH of ascorbic acid is around 3.5 which is below the optimal activity for either alpha or beta amylase. It has been employed primarily by the Dutch millers accustomed to using a lean dough formula of flour, water, 2% salt and yeast based on the weight of the flour. A more ready digestibility is obtained when the starch has undergone preliminary gelatinization.

I have found that this preliminary gelatinization is accomplished by adding urea ascorbate to the flour mix in the first proofing with the dough temperature at 28° C. The amount of urea ascorbate to be added depends on the nature of the flour, soft or hard, domestic or foreign, the amount of gluten present and may thus vary from 0.5% (based on the weight of the flour) in soft grains to 30% for a high protein gluten bread.

The first proofing is run for 25 minutes and the dough is ready for punching. The second proofing is for 20 minutes and is ready for scaling and rounding. The third proofing is for 20 minutes and is ready for moulding and panning. The pan (final) proof varies from 60 to 75 minutes and it is ready for baking after 30 minutes at approximately 250° C.

Thus a calculated amount of urea ascorbate can be used to prepare for mechanical as well as customary bread baking a uniform result from a calculated flour, producing thereby a standard and uniform type of bread. It also makes possible the preparation of high protein breads by mechanical as well as customary methods.

The urea ascorbate has a unique action in freeing the starch granule from the small amounts of protective protein by deploymerizing the protein and simultaneously starting a hydrolysis of the starch granule induced by the appearance of gelatinization observable both by macroscopic appearance and under the microscope. Since this action is precisely what is accomplished by alpha amylase, the beta amylase is able to dextrinize the starch further. Where a malt supplement is added, as little as 10% of the usual amount of urea ascorbate need be used or preferably calcium urea ascorbate or calcium ascorbate alone is employed since the calcium ascorbate or calcium urea ascorbate enhances the action of the alpha amylase in malt.

Where a fungal alpha amylase is used as a supplement, this urea ascorbate is a sufficient adjunct since fungal alpha amylase does not require the calcium ion in contrast to crystalline malt alpha amylase which is activated by calcium ions.

Another marked advantage of my urea ascorbate is the maintenance of crumb softness resulting from the more complete gelatinization of the starch granule. There is less hardness and prolonged compressibility with an increased period of freshness.

Still another advantage of my urea ascorbate flour additive is both an improvement in flavor and rich brown crust formation. There is also a diminution of time required to produce a given amount of carbon dioxide since the yeast production of carbon dioxide is stimulated by the urea ascorbate.

A still further advantage of my urea ascorbate, calcium urea ascorbate, and calcium ascorbate is its capacity to inhibit the formation of hydroxy methyl furfural during the baking period, particularly where glucose is added in breadmaking. The conversion of some of the glucose to hydroxy methyl furfural during the heat of baking creates an agent of toxic potentiality that may be inhibited and corrected by my additive ascorbates.

Where a flour is employed that is adequate in alpha and beta amylase and where prolonged crumb softness and compressibility is the main objective, I may use monoethanolamine ascorbate in the same manner as urea ascorbate, calcium urea ascorbate or calcium ascorbate. Where only the ascorbic radical effect is desired in the inhibition of hydroxymethyl furfural, I may use sodium ascorbate.

Bread containing 0.5 to 1.0 gram of urea ascorbate per pound loaf keeps its freshness for four or five days instead of two days. It may be added at various stages of the mix, but preferably during the kneading period.

As an example, four grams of urea ascorbate were added to four pounds of shortening dough during kneading, and fermentation was allowed to proceed for the customary time. The dough was less tacky and easier to handle, and had a smoother consistency. The bread baked well and remained fresh for several days.

While I have described herein some embodiments of my invention, I wish it to be understood that I do not intend to limit myself thereby except within the scope of the claims hereto or hereinafter appended.

I claim:
1. In the making of bread, the step of adding to the dough a urea ascorbate during the keading of the dough.
2. In the making of bread, the step of adding to the dough 0.5 to 1.0 gram of a urea ascorbate per pound during the kneading of the dough.
3. Dough containing 0.5 to 1.0 gram of urea ascorbate per pound.
4. In the making of bread, the step of adding to the dough a urea ascorbate during the proofing of the dough.

References Cited in the file of this patent
UNITED STATES PATENTS

| | | |
|---|---|---|
| 2,033,180 | Bunzell | Mar. 10, 1935 |
| 2,149,682 | Jorgensen | Mar. 7, 1939 |
| 2,300,439 | Van der Lee | Nov. 3, 1942 |
| 2,539,483 | Ruskin | Jan. 30, 1951 |